(12) United States Patent
Gorelik et al.

(10) Patent No.: US 10,515,366 B1
(45) Date of Patent: Dec. 24, 2019

(54) NETWORK NEIGHBORHOOD TOPOLOGY AS A PREDICTOR FOR FRAUD AND ANOMALY DETECTION

(71) Applicant: EMC IP Holding Company LLC, Hopkinton, MA (US)

(72) Inventors: Boris Gorelik, Mazkeret Batya (IL); Anatoly Gendelev, Rechovot (IL); Liron Liptz, Even Yehuda (IL); Alex Zaslavsky, Petah Tiqwa (IL); Marcelo Blatt, Modiin (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/139,956

(22) Filed: Dec. 24, 2013

(51) Int. Cl.
G06Q 20/40 (2012.01)

(52) U.S. Cl.
CPC .............................. G06Q 20/4016 (2013.01)

(58) Field of Classification Search
CPC ... G06Q 20/405; G06Q 20/40; G06Q 20/4016
USPC ........................................................ 705/44
See application file for complete search history.

(56) References Cited

U.S. PATENT DOCUMENTS

| 7,793,835 | B1 | 9/2010 | Coggeshall et al. |
| 7,890,518 | B2 | 2/2011 | Aasman |
| 8,458,090 | B1 | 6/2013 | Batra et al. |
| 8,856,923 | B1 * | 10/2014 | Kolman ............ G06Q 20/4016 380/255 |
| 2005/0154701 | A1 * | 7/2005 | Parunak et al. .................. 707/1 |
| 2010/0169137 | A1 * | 7/2010 | Jastrebski ............. G06Q 20/04 715/215 |
| 2011/0239195 | A1 * | 9/2011 | Lin et al. ...................... 717/126 |
| 2011/0258118 | A1 * | 10/2011 | Ciurea ........................... 705/44 |
| 2013/0013502 | A1 * | 1/2013 | Purvis ............................. 705/42 |

\* cited by examiner

Primary Examiner — Hai Tran
(74) Attorney, Agent, or Firm — BainwoodHuang

(57) ABSTRACT

An improved technique involves generating, from historical transaction data, a relational graph that represents connections between users who initiate transactions and transaction devices used to carry out the transactions. By supplementing traditional relational database models with a tool such as a graph database, a risk analysis server is able to express users and transaction devices as nodes in a graph and the connections between them as edges in the graph. The risk analysis server may then match the topology of the graph in a neighborhood of the user initiating the transaction to a known topology that is linked to an indication of risk. In some arrangements, this topology is an input into a risk model used to compute a risk score for adaptive authentication.

20 Claims, 6 Drawing Sheets

NETWORK NEIGHBORHOOD TOPOLOGY AS A PREDICTOR FOR FRAUD AND ANOMALY DETECTION

BACKGROUND

Some electronic service providers use conventional adaptive authentication systems that assess a risk of processing customer transactions. For example, an online bank may employ such a risk-based authentication system to assign risk scores to banking transactions where higher risk scores indicate higher risk.

In generating a risk score, an adaptive authentication system takes as input values of various transaction attributes (e.g., time of receipt, geolocation, transaction amount). For each customer of the online bank, there is an associated history based on values of the attributes associated with previous transactions involving that customer. The adaptive authentication system incorporates the history associated with the customer into an evaluation of the risk score. Significant variation of one or more attribute values from those in the customer's history may signify that the banking transaction has a high risk.

For example, suppose that a particular customer historically submitted transaction requests to the online bank at about 5 PM from London, and, under the customer's identifier, a user submits a new transaction request at 2 AM from Texas. In this case, the risk engine would assign a larger risk score to a transaction resulting from the new transaction request.

SUMMARY

Unfortunately, there are deficiencies with the above-described conventional adaptive authentication systems. For example, conventional adaptive authentication may underestimate the risk score in some transactions because it focuses on a particular user at the expense of the other aspects of these transactions. Along these lines, conventional adaptive authentication provides a way to take into account, for example, whether devices that a user is using to initiate a transaction has been used in fraudulent transactions, or whether a payee into which the user is paying has been accessed by malicious individuals. This is usually performed by keeping historical records, or profiles, on every user, device or payee. Using such profiles, however, involves impractically high computational costs and, more importantly, does not provide a way to generalize behavioral patterns to users, devices or payees that were not seen earlier by the risk engine.

As an example, consider a user who logs into the bank customer's account as is considered normal from London at 5 PM and withdraws an amount of money that fits in with the known transaction history of the customer. Suppose that, however, this user initiates the withdrawal with a cell phone that has never been associated with any fraudulent activity. Suppose also that this cell phone is used to carry out dozens of account accesses for different customers within this bank within a short period of time. It is therefore highly likely that a fraudster has gotten hold of information for these bank customers and is using the same device to make fraudulent attempts at accessing accounts at the bank. Conventional fraud detection which considers only the behavior of a user and associated profiles may allow this transaction to go through, even though there is egregious fraud taking place.

It should be understood that a reason that conventional adaptive authentication systems only focus on the user that initiates a transaction is because databases from which transaction histories are accessed are limited in their ability to represent complex relationships. These databases employ a traditional relational database model in which the expression of relationships through a query such as "who knows whom" is a non-trivial and computationally expensive task for big data analysis used in adaptive authentication.

In contrast with the above-described conventional adaptive authentication systems which may underestimate the risk in processing a transaction because they only consider a user in isolation from his or her environment, an improved technique involves generating, from historical transaction data, a relational graph that represents connections between users who initiate transactions and transaction devices used to carry out the transactions. By supplementing traditional relational database models with a graph database that generates such relational graphs, a risk analysis server is able to express users and transaction devices as nodes in a graph and the connections between them as edges in the graph. The risk analysis server may then match the topology of the graph in a neighborhood of the user initiating the transaction to a known topology that is linked to an indication of risk. In some arrangements, this topology is an input into a risk model used to compute a risk score for adaptive authentication.

Advantageously, the improved technique enables a risk analysis server to use information collected in previous transactions that was not being used in order to generate a more accurate picture of the risk involved in transactions. For example, the connections found in this information which is being expressed in terms of specific topologies may be used as a predictor of the risk that a transaction involving specific users, devices and accounts is fraudulent. Further, the improved technique has applications to any transaction classification methodology.

One embodiment of the improved technique is directed to a method of verifying whether transactions are fraudulent. The method includes receiving transaction data that contains information about users who initiate transactions and transaction devices used to carry out the transactions. The method also includes generating, from the transaction data, a relational graph that represents connections between the users and the transaction devices. The method further includes performing a risk analysis operation on the relational graph, the risk analysis operation being configured to provide, as output, a likelihood of fraud for the transactions.

Additionally, some embodiments of the improved technique are directed to an apparatus constructed and arranged to verify whether transactions are fraudulent. The apparatus includes memory and a set of processors coupled to the memory to form controlling circuitry. The controlling circuitry is constructed and arranged to carry out a method of verifying whether transactions are fraudulent.

Furthermore, some embodiments of the improved technique are directed to a computer program product having a non-transitory computer-readable storage medium which stores code including a set of instructions which, when executed by a data storage system, cause the data storage system to carry out a method of verifying whether transactions are fraudulent.

In some arrangements, the relational graph includes a set of vertices and edges, each of the set of vertices representing entities including one of a user and a transaction device, i.e., a device used to initiate a transaction, a payee, an IP address, a geographical location, and the like. Each of the set of edges represents a connection between the users, and the transaction devices. Performing the risk analysis operation includes, for a transaction, identifying vertices of the relational graph representing the above mentioned entities, identifying edges of the relational graph representing connections between these entities involved in the transaction, and generating the likelihood of fraud for the transaction based on the topology of the identified edges and vertices.

In some arrangements, generating the likelihood of fraud for the transaction includes for a particular vertex of the relational graph representing a transaction, identifying a neighborhood of vertices and edges about the particular vertex, the neighborhood of vertices and edges including a set of vertices that are less a given pre-defined or calculated number of edges away from the particular vertex, and producing the likelihood of fraud according to the identified neighborhood of vertices and edges.

In some arrangements, producing the likelihood of fraud according to the identified neighborhood of vertices includes performing a matching operation on the identified neighborhood and a set of predefined neighborhoods of vertices and edges, the matching operation being configured to produce a matching predefined neighborhood of vertices and edges having a set of vertices and edges that matches the vertices and edges of the identified neighborhood, and generating the likelihood of fraud according to the matching predefined neighborhood of vertices and edges.

In some arrangements, each of the set of predefined neighborhood of vertices and edges further includes a neighborhood identifier that identifies that predefined neighborhood of vertices and edges. Generating the likelihood of fraud according to the matching predefined neighborhood of vertices and edges includes inputting the neighborhood identifier of the matching predefined neighborhood of vertices and edges into a risk engine configured to produce a risk score indicative of the likelihood of fraud of the transaction, the risk score being based on values of parameters of the transaction including a value of the neighborhood identifier of the matching predefined neighborhood of vertices and edges, and receiving the risk score from the risk engine.

In some arrangements, the risk engine includes a risk model by which the risk score is produced, the risk model including a set of Bayesian weights, each of the set of Bayesian weights corresponding to a parameter of the transaction. Generating the likelihood of fraud according to the matching predefined neighborhood of vertices and edges further includes providing a command to the risk engine to add, to a nominal risk score that does not depend on the value of the neighborhood identifier of the matching predefined neighborhood of vertices and edges, a product of a Bayesian weight corresponding to the neighborhood identifier of the matching predefined neighborhood of vertices and edges and a value of a risk metric assigned to the value of the neighborhood identifier.

In some arrangements, the method further includes receiving results of external fraud analysis of transactions having a high likelihood of fraud based on the value of the neighborhood identifier of matching predefined neighborhoods of vertices and edges for the transactions, performing a comparison operation on the results of the external fraud analysis and corresponding risk scores produced by the risk model, the comparison operation producing a comparison result, and adjusting the Bayesian weights of the risk model corresponding to the neighborhood identifier of matching predefined neighborhoods of vertices and edges for the transactions based on the comparison result.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique involves generating, from historical transaction data, a relational graph that represents connections between users who initiate transactions and transaction devices used to carry out the transactions. By supplementing traditional relational database models with a tool such as a graph database, a risk analysis server is able to express users and transaction devices as nodes in a graph and the connections between them as edges in the graph. The risk analysis server may then match the topology of the graph in a neighborhood of the user initiating the transaction to a known topology that is linked to an indication of risk. In some arrangements, this topology is an input into a risk model used to compute a risk score for adaptive authentication.

Advantageously, the improved technique enables a risk analysis server to use information collected in previous transactions that was not being used in order to generate a more accurate picture of the risk involved in transactions. For example, the connections found in this information which is being expressed in terms of specific topologies may be used as a predictor of the risk that a transaction involving specific users, devices and accounts is fraudulent. Further, the improved technique has applications to any fraud detection methodology.

Figure 1:
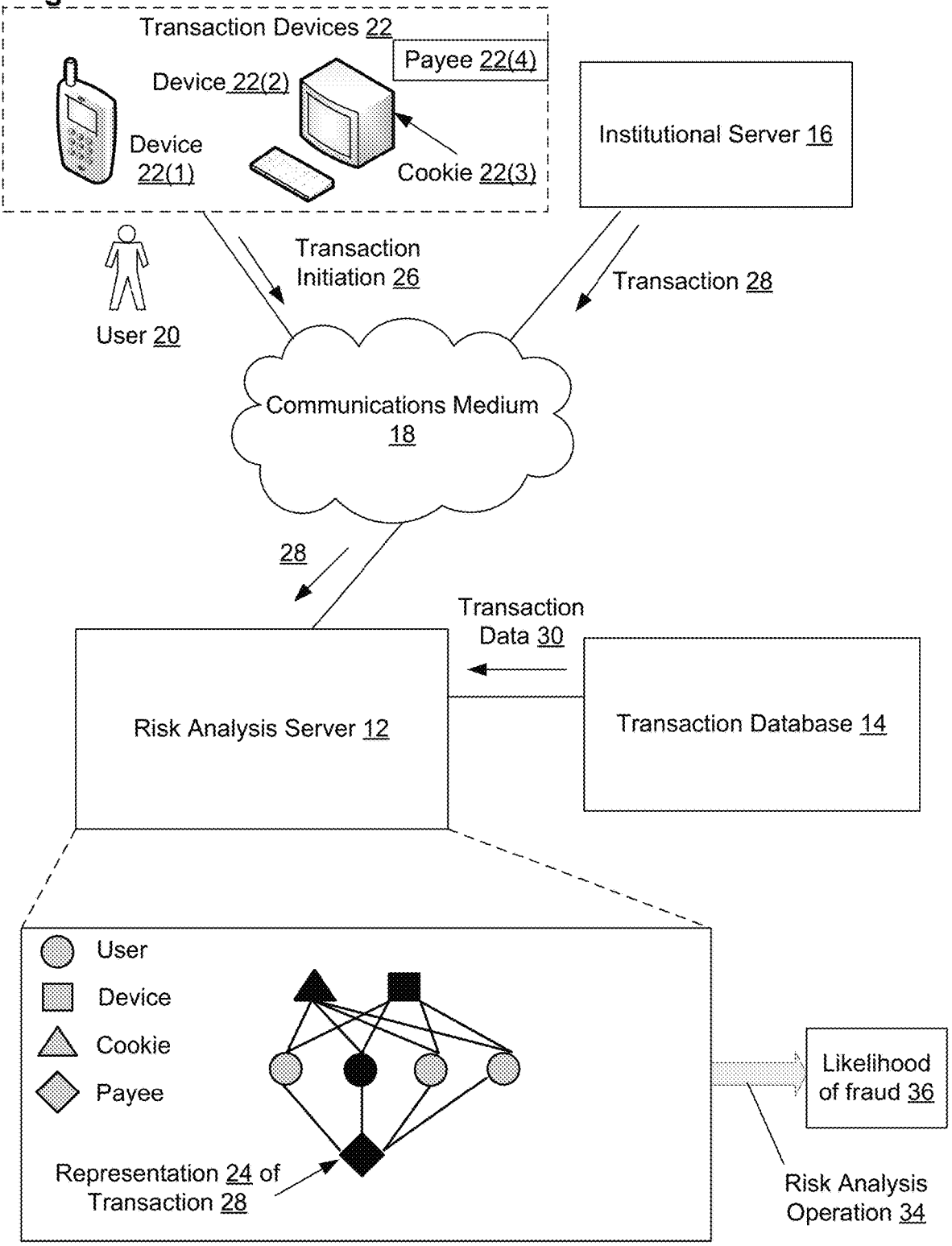
FIG. 1 is a block diagram illustrating an example electronic environment in which the improved technique may be carried out.

FIG. 1 illustrates an example electronic environment 10 in which the improved technique can be carried out. Electronic environment 10 includes transaction devices 22 used by user 20 to initiate transaction 26, institutional server 16, communications medium 18, risk analysis server 12, and transaction database 14.

Institutional server 16 hosts an account to which user 20 wants access. For example, institutional server 16 hosts an account associated with a bank from which user 20 wishes to withdraw money. In some arrangements, however, institutional server 16 may be associated with a government, a hospital, a corporation, or the like.

Transaction devices 22 may include any instruments used by user 20 for initiating transaction 26. For example, user 20 may attempt to access a bank account within institutional server 16 using portable device 22(1) (e.g., a smartphone). Alternatively, user 20 may attempt to access the bank account using a personal computer 22(2). On personal computer 22(2), there may be a cookie 22(3) that contains login information for either user 20 or another user.

Another example of a transaction device 22 is an account with which user 20 interacts. For example, user 20 may access an account at a bank in order to deposit money into a payee account 22(4). One common example of a payee account 22(4) would be a deposit account of an electric company into which user 20 deposits money in order to pay an electric bill. Another example of a payee account 22(4) would be an account at an offshore bank associated with known felons; such a payee account 22(4) may raise alerts about user 20.

Risk analysis server 12 is a server or a cluster of servers which is configured to detect fraud with a transaction or group of transactions. To this effect, risk analysis server 12 is configured to communicate with transaction database 14 to obtain historical transaction data 30. Risk analysis server 12 may also receive new transaction data 28 from institutional server 16 over communications medium 18 in response to transaction initiation 26 from user 20. In some arrangements, risk analysis server 12 computes a risk score for a transaction as part of an adaptive authentication scheme.

Risk analysis server 12 also runs a graph database that is configured to produce a representation 24 of a transaction or set of transactions, e.g., transaction 28. The graph database is a database that uses graph structures having nodes and edges to represent relationships between transaction data, e.g., transaction data 30 and/or transaction 28. As is discussed in detail below, risk analysis server 12 uses such a graph database to generate representation 24. Risk analysis server 12 then analyzes representation 24 in order to deduce new information about the context in which a transaction such as transaction 28 takes place.

For example, suppose that user 20 seeks to move money from a bank account into a payee account. When transaction 28 represents this money movement, transaction 28 includes information about not only user 20 (e.g., IP address, geolocation, login time, etc.), but also about the transaction devices used (e.g., computer 22(2) and payee account 22(4)). Risk analysis server 12, using the graph database, is able to look at a larger picture, e.g., who else moved money into the payee account, and with which devices.

Transaction database 14 is connected to risk analysis server 12 either locally or remotely, and stores historical transaction data 30. Transaction database 14 provides transaction data 30 in response to a request from risk analysis server 12, or periodically, e.g., as a nightly computation. It should be understood that transaction database 14 can be either a relational database or a graph database.

Historical transaction data 30 contains data from all previous transactions processed by risk analysis server 12. Historical transaction data 30 contains values of parameters for each transaction, arranged in such a way that specific transactions may be found through a query. In generating representation 24, risk analysis server 12 locates transaction data within historical transaction data 30 not only for user 20, but also for transaction devices 22. For example, risk analysis server 12 may be able to deduce other users who have accessed payee account 22(4) from historical transaction data 30 using representation 24 generated from the graph database.

Communications medium 18 provides network connections between risk analysis server 12, institutional server 16, and transaction devices 22. Communications medium 18 may implement a variety of protocols such as TCP/IP, UDP, ATM, Ethernet, Fibre Channel, combinations thereof, and the like. Furthermore, communications media 18 may include various components (e.g., cables, wireless, switches/routers, gateways/bridges, NAS/SAN appliances/nodes, interfaces, etc.). Moreover, the communications medium 18 are capable of having a variety of topologies (e.g., queue manager-and-spoke, ring, backbone, multi drop, point to-point, irregular, combinations thereof, and so on).

During an example operation, user 20 provides a transaction initiation 26 by requesting a transaction through a banking institution to move an amount of money from a specified account into payee account 22(4). To initiate this transaction, user 20 logs in on desktop computer 22(2), which has a cookie 22(3) containing data pertaining to some web site accessed by computer 22(2).

Institutional server 16 receives transaction initiation 26 and forms transaction 28 from data supplied in transaction initiation 26 and other information it has pertaining to user 20 and his account. Transaction 28 may contain information about user, e.g., geolocation, timestamp, biometric data, etc. Transaction 28 also contains information about transaction devices 22 such as a device identifier for computer 22(2), its IP address, cookies 22(3) that are stored in it, etc., as well as information regarding payee account 22(4), e.g., location of hosting institution, account identifier, etc.

Institution server 16 sends transaction 28 to risk analysis server 12 via communications medium 18. For example, institutional server 16 may upload transaction 28 via an established extranet established by risk analysis server, or may email transaction 28 to risk analysis server.

Meanwhile, risk analysis server 12 has accessed historical transaction data 30, e.g., periodically, and has input this data into the graph database. Upon receiving transaction 28, risk analysis server inputs this data as well into the graph database, which forms topological representation 24 of a transaction neighborhood of transaction 28. As illustrated in FIG. 1, representation 24 includes a set of connected nodes. The darkly shaded nodes represent entities such as user 20, device 22(2), cookie 22(3), and payee account 22(4), referred to in transaction 28. The lightly shaded nodes represent users not referred to in transaction 28, but referred to in transaction historical data 30. In this case, all of the users accessed payee account 22(4) using the same device 22(2) having the same cookie 22(3). Such a conclusion may not have been possible without being able to generate the connections via the graph database.

Risk analysis server 12 then performs a risk analysis operation 34 on representation 24 to determine whether there are indications of fraud within transaction 28. For example, risk analysis operation 34 may involve inputting a metric related to topological representation 24 into a risk engine to compute a risk score. In another example, risk analysis operation may involve comparing topological representation 24 to blacklisted topological representations. Further detail of an example risk analysis operation is discussed below in connection with FIGS. 3 and 4.

In some arrangements, risk analysis server 12 performs risk analysis operation 34 on topological representation 24 to determine the likelihood that topological representation 24 is anomalous in the context of data stored in transaction database 14.

Risk analysis operation 34 results in an output indicative of a likelihood of fraud or anomaly 36. For example, if risk analysis operation 34 involves computing a risk score, then a risk score higher than some threshold would indicate likely fraud, and certain actions would be taken (e.g., denial of transaction, more challenges).

Further detail of risk analysis server 12 is provided below in connection with FIG. 2.

Figure 2:
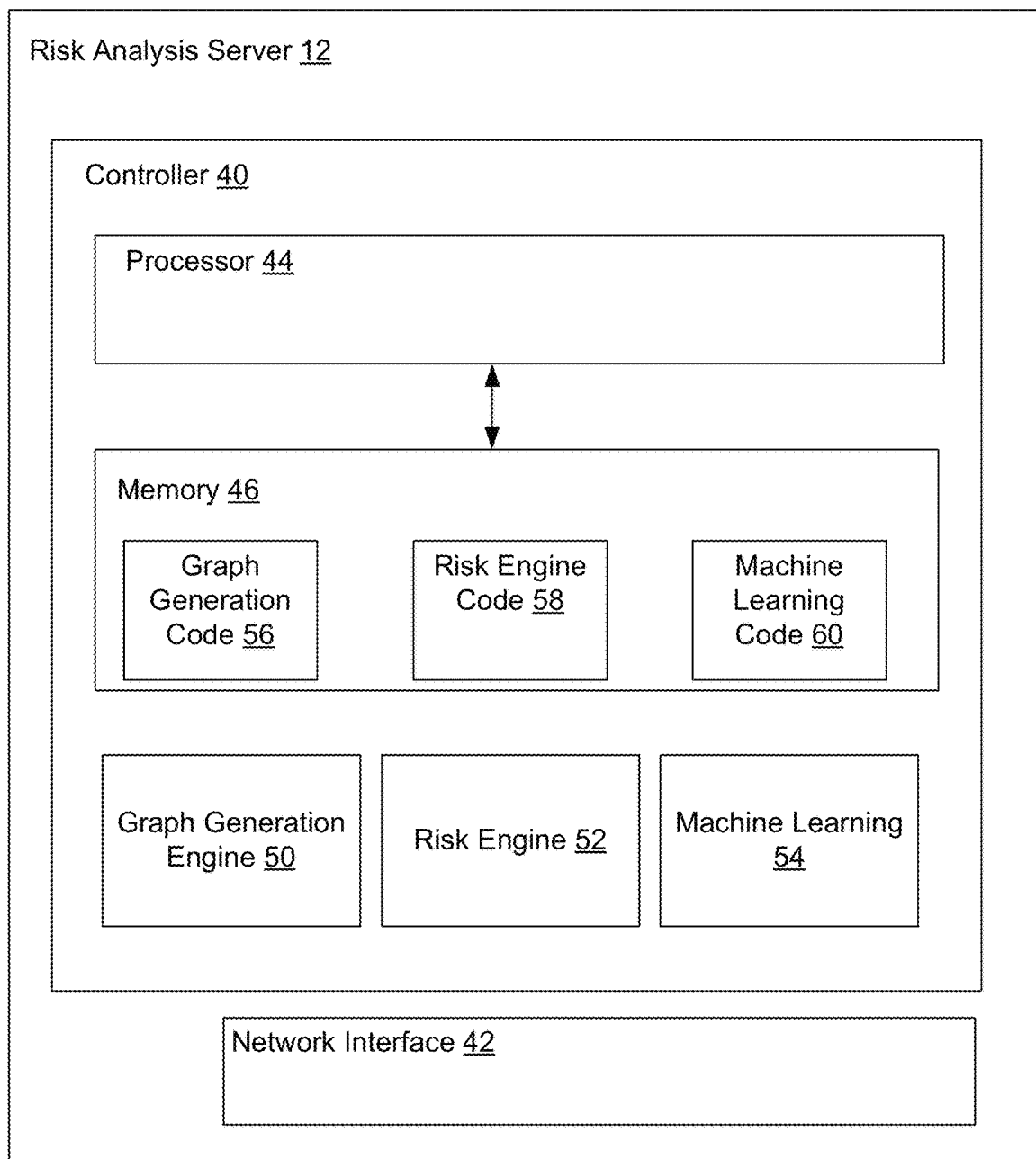
FIG. 2 is block diagram illustrating an example risk analysis server within the data storage system shown in FIG. 1.

FIG. 2 illustrates risk analysis server 12. Risk analysis server 12 includes controller 40, which in turn includes processor 44 and memory 46, and network interface 42.

Network interface 42 takes the form of an Ethernet card; in some arrangements, network interface 42 takes other forms including a wireless receiver and a token ring card.

Memory 46 is configured to store code for implementing the improved techniques. In an example, memory 46 includes graph generation code 56 (e.g., the graph database) for generating representations, e.g., representation 24. In some arrangements, memory 46 also includes risk engine code 58 for computing risk scores, i.e., when risk analysis server 12 is configured to perform adaptive authentication. In some further arrangements, memory 46 includes machine learning code 60 for performing machine learning operations to improve models used by risk engine 52. Memory 46 generally takes the form of, e.g., random access memory, flash memory or a non-volatile memory.

Processor 44 takes the form of, but is not limited to, Intel or AMD-based MPUs, and can include a single or multi-cores each running single or multiple threads. Processor 44 is coupled to memory 46 and is configured to execute instructions from graph generation code 56, risk engine code 58, and machine learning code 60, using graph generation engine 50, risk engine 52 and machine learning engine 54.

It should be understood that, in some arrangements, memory 46 is also configured to store representations such as representation 24 for comparison with other representations that may be indicative of low- or high-risk transactions. Further discussion of this concept is discussed below in connection with FIG. 3.

Figure 3:
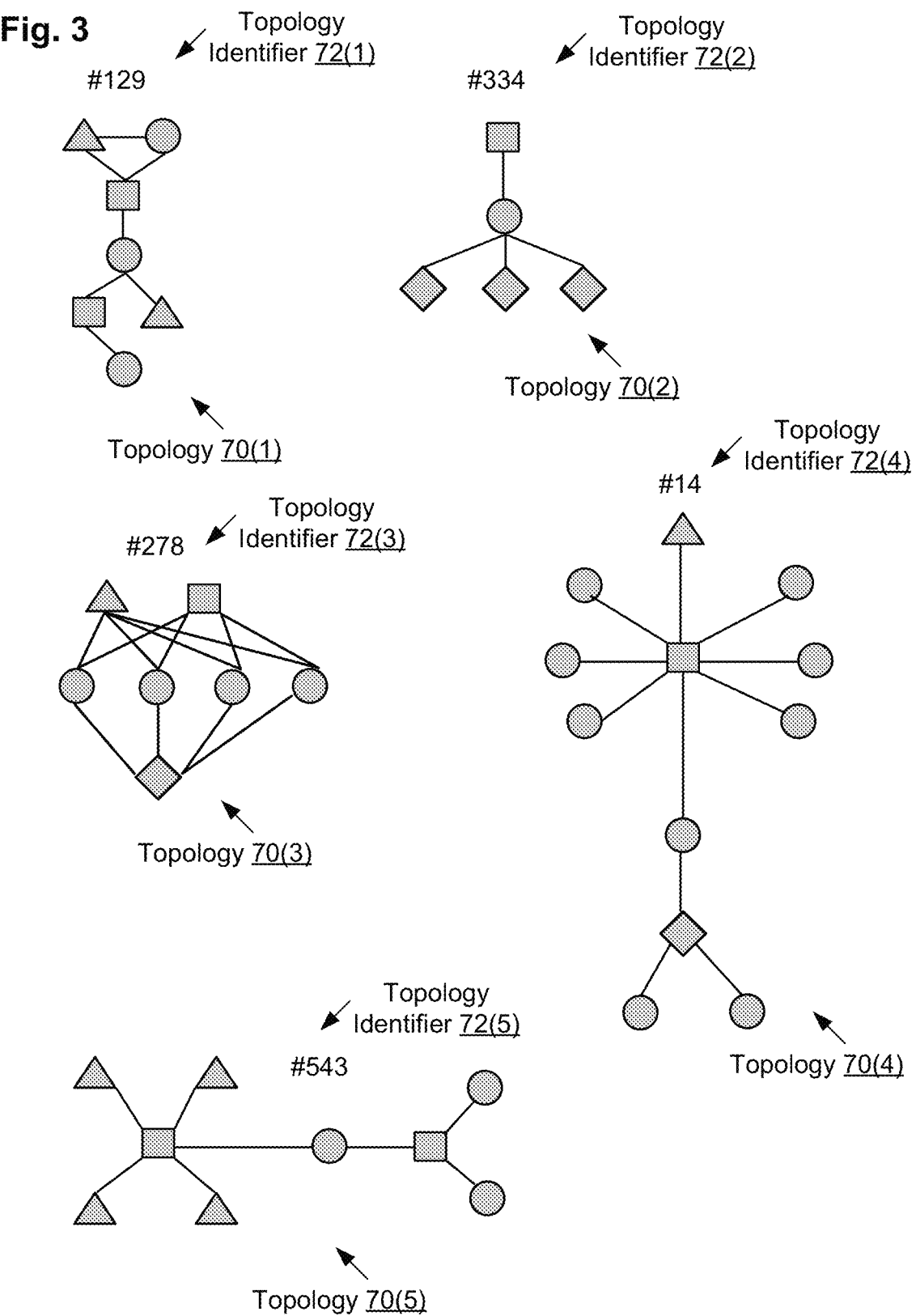
FIG. 3 is a block diagram illustrating example topologies considered by the risk analysis server shown in FIG. 2.

FIG. 3 illustrates a number of representations, or topologies, generated by the graph database running on risk analysis server 12 using various transactions. In FIG. 3, there are five example topologies illustrated, each of which has a particular interpretation that has implications for risk of fraud. Risk analysis server 12 generated each of these topologies with respect to user 20.

For example, topology 70(1) shows a scenario in which user 20 is linked with two devices, each of which is linked with a cookie. Each of the devices is linked with another user, although in only one of the devices is a cookie linked with the other user. Such a topology is not indicative of a high risk of fraud.

Topology 70(2) shows user 20 linked with a single device and multiple payee accounts. This represents a commonplace scenario in which a user simply pays multiple bills on the same computer. Such a topology is also not indicative of a high risk of fraud.

Topology 70(3) shows a typical case of user 20 among several users that transfer money to a single destination and use the same computer. Such a topology is indicates a high risk of fraud.

Topology 70(4) shows a situation where a single device is associated with multiple user accounts. Depending on the number of such accounts, this pattern is an indication of either publicly shared device or a fraud attack where a potential fraudster attempts to break several accounts.

Topology 70(5) shows a topology that corresponds to cookie highjack attack: a single device that uses several cookies, and is therefore indicative of a high risk of fraud.

In some arrangements, topologies such as topologies 70(1), . . . , 70(5), and many others, are stored in memory 46 for the purposes of comparison with topologies generated by risk analysis server 12 in response to receiving new transactions such as transaction 28. In some arrangements, risk analysis server 12 assigns an identifier to each of these topologies, e.g., topology identifier 72(1) for topology 70(1), topology identifier 72(2) for topology 70(2), topology identifier 72(3) for topology 70(3), topology identifier 72(4) for topology 70(4), 72(5) for topology 70(5), and so on. Such identifiers provide a simple way to refer to complex topologies for input into risk models, for example. Further discussion of such concepts is discussed below in connection with FIG. 4.

Figure 4:
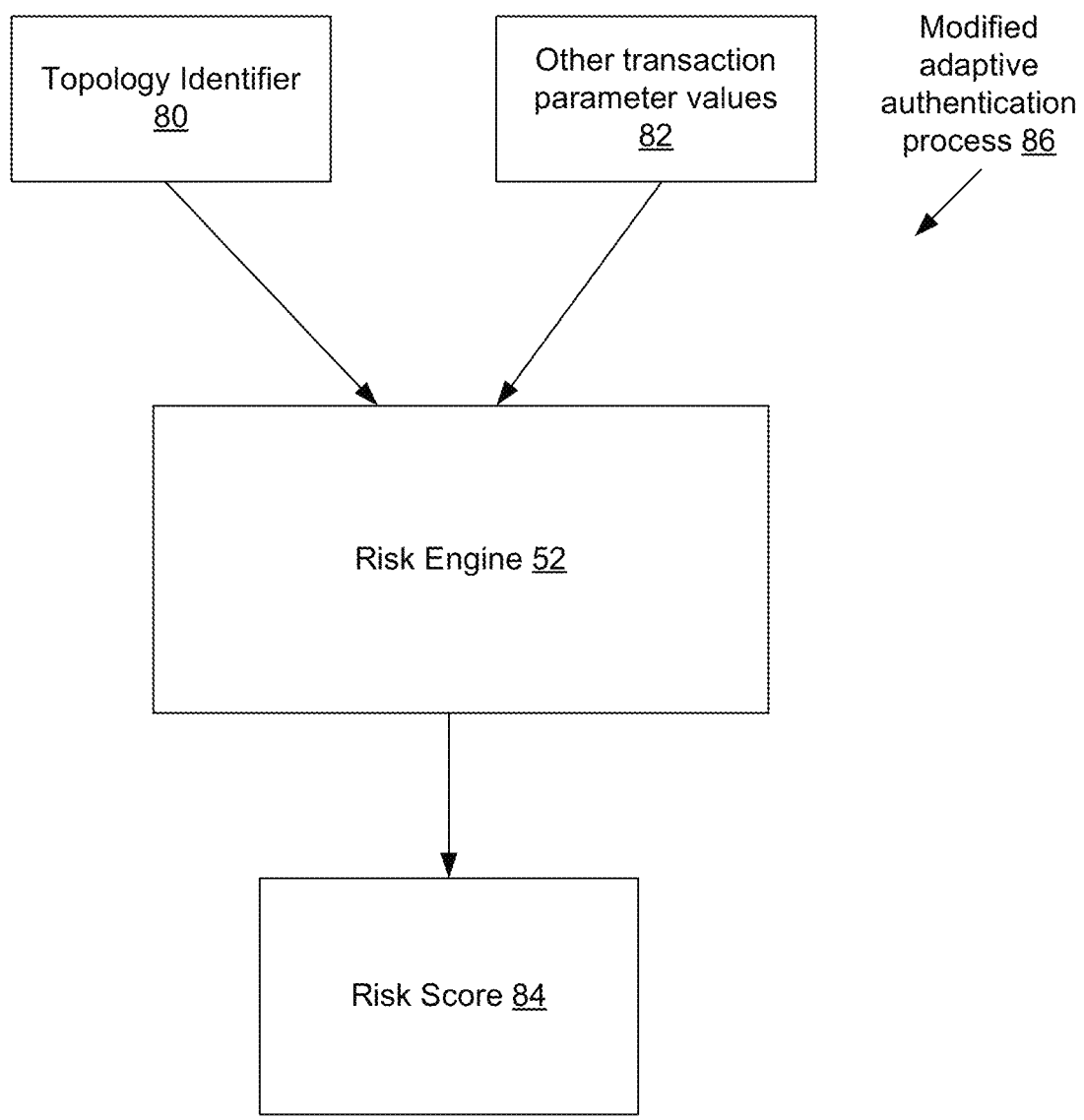
FIG. 4 is a block diagram illustrating an example risk score computation involving the example topologies shown in FIG. 3.

FIG. 4 illustrates a modified adaptive authentication process 86 according to the improved techniques. Modified adaptive authentication process 86 resembles ordinary adaptive authentication in that a risk model is used to compute a risk score; nevertheless, modified adaptive authentication process 86 takes in a topology identifier 80 as described above as input into a risk model.

In the example shown in FIG. 4, risk engine 52 in risk analysis server 12 takes in as input, in addition to usual transaction parameter values such as geolocation, IP address, transaction amount, time, etc., topology identifier 80. As shown in FIG. 3, topology identifier may simply be an integer, although in some arrangements, topology identifier 80 may involve character symbols or the like.

During operation, risk engine 52 performs a lookup operation on a table stored in memory that associates topology identifiers with respective topologies and predetermined risk values resulting from those topologies. Such risk values result from a knowledge base of transaction activity. In some arrangements, a risk value takes the form of a Bayesian weight that may be adjusted through a machine learning process. In other arrangements, the risk value may be a binary value (e.g., 0 or 1 representing high risk or low risk), while a Bayesian weight in a risk model applies to all topologies equally.

Risk engine 52 then outputs a risk score from the topology identifier 80 and other factors 82. Risk analysis server 12 then applies risk score 84, as discussed above, in determining whether there is an indication of fraud in transactions such as transaction 84.

It should be understood, however, that the above operation is but one scenario that is possible using risk analysis server 12 according to the improved techniques. For example, another scenario involves out-of-band analysis of transaction data 30 in order to provide more accurate analysis of risk to past transactions after the fact. Such an analysis may be fed into a machine learning tool, e.g., machine learning engine 60, for better predictions of risk involved in new transactions.

As discussed above, in some arrangements the risk model used by risk engine 52 may be improved upon by employing machine learning engine 54 to actual transaction results. Further discussion of this concept is discussed below in connection with FIG. 5.

Figure 5:
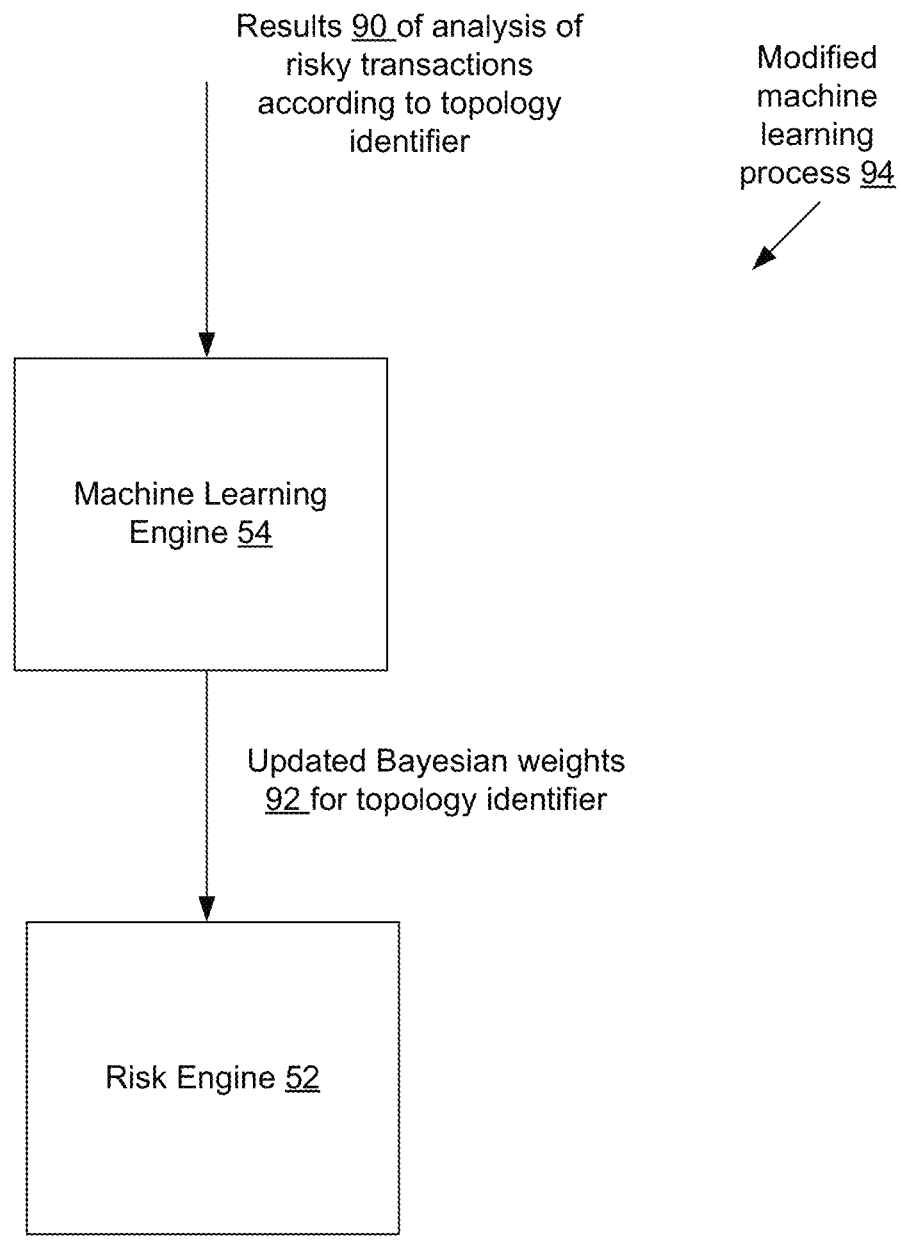
FIG. 5 is a block diagram showing an example machine learning procedure using the risk analysis server shown in FIG. 2.

FIG. 5 illustrates a modified machine learning process 94. Modified machine learning process 94, takes in particular results from, e.g., manual fraud analysis, and performs a machine learning operation such as a neural net analysis on the data to derive new Bayesian weights for parameters used in the above-described risk model of risk engine 52.

In this case, however, modified machine learning process 94 takes in such results 90 that corresponds to values of topology identifiers, e.g., topology identifiers 70. Machine learning engine 54 applies particular machine learning algorithms to find updated Bayesian weights 92 for the topology identifier parameter of the risk model. These weights are then input into risk engine 52. In some arrangements, however, such weights may apply directly to the individual topologies and would be input into a table containing such weights.

Figure 6:
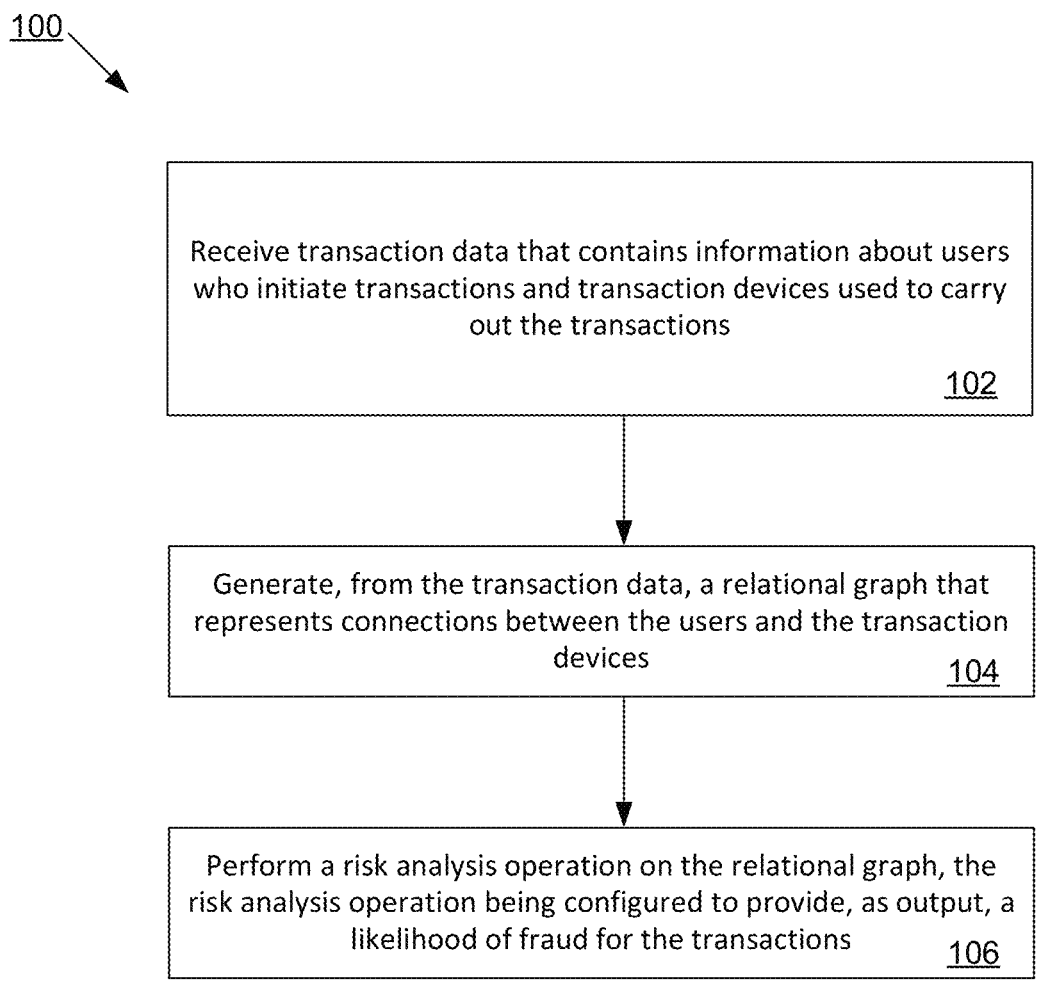
FIG. 6 is a flow chart illustrating an example method of carrying out the improved technique within the data storage system shown in FIG. 1.

FIG. 6 illustrates a method 100 of verifying whether transactions are fraudulent or anomalous, including steps 102, 104, and 106. In step 102, a risk analysis server, e.g., risk analysis server 12, receives transaction data, e.g., transaction data 28, that contains information about users, e.g., user 20 who initiate transactions and transaction devices, e.g. transaction device 22, used to carry out the transactions. In step 104, the risk analysis server generates, from the transaction data, a relational graph, e.g., representation 24, that represents connections between the users and the transaction devices. In step 106, the risk analysis server performs a risk analysis operation, e.g., modified adaptive authentication process 86, on the relational graph, the risk analysis operation being configured to provide, as output, a likelihood of fraud for the transactions.

As used throughout this document, the words "comprising," "including," and "having" are intended to set forth certain items, steps, elements, or aspects of something in in that these are provided by way of example only and the invention is not limited to these particular embodiments. In addition, the word "set" as used herein indicates one or more of something, unless a statement is made to the contrary.

Having described certain embodiments, numerous alternative embodiments or variations can be made. For example, the above discussion has dealt mainly with operations on new transactions. In some arrangements, however, risk analysis engine 12 may use the improved techniques to analyze risk involved in old transactions for, e.g., machine learning purposes.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like. Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

What is claimed is:

1. A computer-based method of verifying whether transactions are fraudulent, the method comprising:
   receiving, by a risk analysis server computer, transaction data that contains information about users who initiate transactions and transaction devices used to carry out the transactions, including information about cookies stored on the transaction devices, each cookie containing information about a website accessed by the transaction device on which that cookie is stored;
   generating, by the risk analysis server computer from the transaction data, a relational graph that represents connections between the users and the transaction devices; and
   performing a risk analysis operation, by the risk analysis server computer on the relational graph, the risk analysis operation being configured to provide, as output, a likelihood of fraud for the transactions;
   wherein performing the risk analysis operation includes:
      identifying vertices of the relational graph representing users and transaction devices involved in a requested transaction with an institutional server computer;
      identifying edges of the relational graph representing connections between the users and the transaction devices involved in the requested transaction;
      generating the likelihood of fraud for the requested transaction based on the identified edges and vertices, wherein generating the likelihood of fraud for the requested transaction includes providing, as output from a risk engine, a risk score indicative of the likelihood of fraud of the requested transaction, the risk score being based on the identified edges and vertices, a high risk score indicating a high level of risk of fraud for the requested transaction being generated in response to the identified edges and vertices forming a topology corresponding to a cookie hijack attack, wherein the topology corresponding to a cookie hijack attack includes a single vertex representing a transaction device that is connected to multiple vertices representing cookies used by the transaction device, and a low risk score indicating a low level of risk of fraud for the requested transaction; and
      in response to a high risk score generated in response to the identified edges and vertices forming the topology corresponding to a cookie hijack attack exceeding a predetermined threshold indicating likely fraud, denying the requested transaction with the institutional server.

2. A method as in claim 1, wherein providing the risk score includes:
   for a particular vertex of the relational graph representing one of a user and a transaction device of the requested transaction, identifying a neighborhood of vertices and edges about the particular vertex, the neighborhood of vertices and edges including a set of vertices that are less a given number of edges away from the particular vertex, and
   producing the risk score according to the identified neighborhood of vertices and edges.

3. A method as in claim 2, wherein producing the risk score according to the identified neighborhood of vertices includes:
   performing a matching operation on the identified neighborhood and a set of predefined neighborhoods of vertices and edges, the matching operation being configured to produce a matching predefined neighborhood of vertices and edges having a set of vertices and edges that matches the vertices and edges of the identified neighborhood, and
   generating the risk score according to the matching predefined neighborhood of vertices and edges.

4. A method as in claim 3, wherein each of the set of predefined neighborhood of vertices and edges further includes a neighborhood identifier that identifies that predefined neighborhood of vertices and edges; and wherein generating the risk score according to the matching predefined neighborhood of vertices and edges includes:
  inputting the neighborhood identifier of the matching predefined neighborhood of vertices and edges into a risk engine configured to produce the risk score, and receiving the risk score from the risk engine.

5. A method as in claim 4, wherein the risk engine includes a risk model by which the risk score is produced, the risk model including a set of Bayesian weights, each of the set of Bayesian weights corresponding to a parameter of the requested transaction; and
  wherein generating the risk score according to the matching predefined neighborhood of vertices and edges further includes:
    providing a command to the risk engine to add, to a nominal risk score that does not depend on the value of the neighborhood identifier of the matching predefined neighborhood of vertices and edges, a product of a Bayesian weight corresponding to the neighborhood identifier of the matching predefined neighborhood of vertices and edges and a value of a risk metric assigned to the value of the neighborhood identifier.

6. A method as in claim 5, further comprising:
  receiving results of external fraud analysis of transactions having a high risk score based on the value of the neighborhood identifier of matching predefined neighborhoods of vertices and edges for the transactions;
  performing a comparison operation on the results of the external fraud analysis and corresponding risk scores produced by the risk model, the comparison operation producing a comparison result; and
  adjusting the Bayesian weights of the risk model corresponding to the neighborhood identifier of matching predefined neighborhoods of vertices and edges for the transactions based on the comparison result.

7. A method as in claim 1:
  wherein performing the risk analysis operation on the relational graph includes:
  outputting a likelihood that the transactions exhibit anomalies.

8. A method as in claim 1,
  wherein generating the relational graph from the transaction data further includes producing the relational graph based on the information about the users, the transaction devices, and the cookies.

9. A method as in claim 8, wherein the relational graph includes a set of vertices and edges, each of the set of vertices representing one of a user, a transaction device, and a cookie, each of the set of edges representing a connection between the users, the transaction devices, and the cookies;
  wherein performing the risk analysis operation includes, for a set of transactions:
    identifying vertices of the relational graph representing users, transaction devices, and cookies involved in the set of transactions,
    identifying edges of the relational graph representing connections between the users, the transaction devices, and the cookies involved in the set of transactions, and
    generating the likelihood of a cookie hijack attack within the set of transactions based on the identified edges and vertices.

10. A method as in claim 1, further comprising:
  wherein receiving the transaction data by the risk analysis computer includes issuing a request for the transaction data from the risk analysis computer to a remote database, and receiving the transaction data by the risk analysis computer as transmitted from the remote transaction database responsive to receipt of the request for the transaction data by the remote database;
  wherein the transaction devices include a user computer used to initiate the transaction, a cookie that contains login information, and a payee account, and wherein the transaction data used to generate the relational graph includes information regarding a user, the user computer used to initiate the transaction, the cookie that contains login information, and the payee account; and
  wherein generating the relational graph that represents connections between the users and the transaction devices is performed by the risk analysis computer and includes locating, by the risk analysis computer, within the transaction data received from the remote transaction database, information regarding the user, the user computer used to initiate the transaction, the cookie that contains login information, and the payee account, in order to separately represent each of the user, the user computer used to initiate the transaction, the cookie that contains login information, and the payee account within the relational graph.

11. An apparatus constructed and arranged to verify whether transactions are fraudulent, the apparatus comprising:
  a network interface;
  memory; and
  a controller including controlling circuitry, the controlling circuitry being constructed and arranged to:
    receive transaction data that contains information about users who initiate transactions and transaction devices used to carry out the transactions, including information about cookies stored on the transaction devices, each cookie containing information about a website accessed by the transaction device on which that cookie is stored;
    generate, from the transaction data, a relational graph that represents connections between the users and the transaction devices; and
    perform a risk analysis operation on the relational graph, the risk analysis operation being configured to provide, as output, a likelihood of fraud for the transactions;
  wherein the controlling circuitry constructed and arranged to perform the risk analysis operation is further constructed and arranged to:
    identify vertices of the relational graph representing users and transaction devices involved in a requested transaction with an institutional server computer;
    identify edges of the relational graph representing connections between the users and the transaction devices involved in the requested transaction;
    generate the likelihood of fraud for the requested transaction based on the identified edges and vertices, wherein the controlling circuitry constructed and arranged to generate the likelihood of fraud for the requested transaction is further constructed and arranged to provide, as output from a risk engine, a risk score indicative of the likelihood of fraud of the requested transaction, the risk score being based on the identified edges and vertices, a high risk score indicating a high level of risk of fraud for the transaction being generated in response to the identified edges and vertices forming a topology corresponding to a cookie hijack attack, wherein the topology corresponding to a cookie hijack attack includes a single vertex representing a transaction device that is connected to multiple vertices representing cookies used by the transaction device, and a low risk score indicating a low level of risk of fraud for the transaction; and in response to a high risk score generated in response to the identified edges and vertices forming the topology corresponding to a cookie hijack attack exceeding a predetermined threshold indicating likely fraud, deny the requested transaction with the institutional server.

12. An apparatus as in claim 11, wherein the controlling circuitry constructed and arranged provide the risk score is further constructed and arranged to:

for a particular vertex of the relational graph representing one of a user and a transaction device of the requested transaction, identify a neighborhood of vertices and edges about the particular vertex, the neighborhood of vertices and edges including a set of vertices that are less a given number of edges away from the particular vertex, and produce the risk score according to the identified neighborhood of vertices and edges.

13. An apparatus as in claim 12, wherein the controlling circuitry constructed and arranged to produce the risk score according to the identified neighborhood of vertices is further constructed and arranged to:

perform a matching operation on the identified neighborhood and a set of predefined neighborhoods of vertices and edges, the matching operation being configured to produce a matching predefined neighborhood of vertices and edges having a set of vertices and edges that matches the vertices and edges of the identified neighborhood, and generate the risk score according to the matching predefined neighborhood of vertices and edges.

14. An apparatus as in claim 13, wherein each of the set of predefined neighborhood of vertices and edges further includes a neighborhood identifier that identifies that predefined neighborhood of vertices and edges; and wherein the controlling circuitry constructed and arranged to generate the risk score according to the matching predefined neighborhood of vertices and edges is further constructed and arranged to:

input the neighborhood identifier of the matching predefined neighborhood of vertices and edges into a risk engine configured to produce the risk score, and receive the risk score from the risk engine.

15. An apparatus as in claim 14, wherein the risk engine includes a risk model by which the risk score is produced, the risk model including a set of Bayesian weights, each of the set of Bayesian weights corresponding to a parameter of the requested transaction; and wherein the controlling circuitry constructed and arranged to generate the risk score according to the matching predefined neighborhood of vertices and edges is further constructed and arranged to:

provide a command to the risk engine to add, to a nominal risk score that does not depend on the value of the neighborhood identifier of the matching predefined neighborhood of vertices and edges, a product of a Bayesian weight corresponding to the neighborhood identifier of the matching predefined neighborhood of vertices and edges and a value of a risk metric assigned to the value of the neighborhood identifier.

16. An apparatus as in claim 15, wherein the controlling circuitry is further constructed and arranged to:

receive results of external fraud analysis of transactions having a high risk score based on the value of the neighborhood identifier of matching predefined neighborhoods of vertices and edges for the transactions;

perform a comparison operation on the results of the external fraud analysis and corresponding risk scores produced by the risk model, the comparison operation producing a comparison result; and adjust the Bayesian weights of the risk model corresponding to the neighborhood identifier of matching predefined neighborhoods of vertices and edges for the transactions based on the comparison result.

17. A computer program product having a non-transitory, computer-readable storage medium which stores instructions that, when executed by a controller, causes the controller to carry out a method of verifying whether transactions are fraudulent, the method comprising:

receiving transaction data that contains information about users who initiate transactions and transaction devices used to carry out the transactions, including information about cookies stored on the transaction devices, each cookie containing information about a website accessed by the transaction device on which that cookie is stored;

generating, from the transaction data, a relational graph that represents connections between the users and the transaction devices; and performing a risk analysis operation on the relational graph, the risk analysis operation being configured to provide, as output, a likelihood of fraud for the transactions;

wherein performing the risk analysis operation includes:

identifying vertices of the relational graph representing users and transaction devices involved in a requested transaction with an institutional server;

identifying edges of the relational graph representing connections between the users and the transaction devices involved in the requested transaction;

generating the likelihood of fraud for the requested transaction based on the identified edges and vertices, wherein generating the likelihood of fraud for the requested transaction includes providing, as output from a risk engine, a risk score indicative of the likelihood of fraud of the transaction, the risk score being based on the identified edges and vertices, a high risk score indicating a high level of risk of fraud for the requested transaction being generated in response to the identified edges and vertices forming a topology corresponding to a cookie hijack attack, wherein the topology corresponding to a cookie hijack attack includes a single vertex representing a transaction device that is connected to multiple vertices representing cookies used by the transaction device, and a low risk score indicating a low level of risk of fraud for the transaction; and in response to a high risk score generated in response to the identified edges and vertices forming the topology corresponding to a cookie hijack attack exceeding a predetermined threshold indicating likely fraud, denying the requested transaction with the institutional server.

18. A computer program product as in claim 17, wherein providing the risk score for the requested transaction includes:
- for a particular vertex of the relational graph representing one of a user and a transaction device of the transaction, identifying a neighborhood of vertices and edges about the particular vertex, the neighborhood of vertices and edges including a set of vertices that are less a given number of edges away from the particular vertex, and producing the risk score according to the identified neighborhood of vertices and edges.

19. A computer program product as in claim 18, wherein producing the risk score according to the identified neighborhood of vertices includes:
- performing a matching operation on the identified neighborhood and a set of predefined neighborhoods of vertices and edges, the matching operation being configured to produce a matching predefined neighborhood of vertices and edges having a set of vertices and edges that matches the vertices and edges of the identified neighborhood, and
- generating the risk score according to the matching predefined neighborhood of vertices and edges.

20. A computer program product as in claim 19,
- wherein each of the set of predefined neighborhood of vertices and edges further includes a neighborhood identifier that identifies that predefined neighborhood of vertices and edges; and
- wherein generating the risk score according to the matching predefined neighborhood of vertices and edges includes:
- inputting the neighborhood identifier of the matching predefined neighborhood of vertices and edges into a risk engine configured to produce the risk score, and
- receiving the risk score from the risk engine.

* * * * *